W. B. FOSTER.
BRONZING MACHINE.
APPLICATION FILED SEPT. 19, 1910.

1,068,882.

Patented July 29, 1913.

WITNESSES:
Geo. E. Spitzli
H. M. Clark

INVENTOR
William B. Foster.
BY
Risley Love
ATTORNEYS

UNITED STATES PATENT OFFICE.

WILLIAM B. FOSTER, OF UTICA, NEW YORK, ASSIGNOR, BY MESNE ASSIGNMENTS, TO BRADLEY AND VROOMAN COMPANY, OF CHICAGO, ILLINOIS, A CORPORATION OF ILLINOIS.

BRONZING-MACHINE.

1,068,882.          Specification of Letters Patent.     Patented July 29, 1913.

Application filed September 19, 1910. Serial No. 582,614.

*To all whom it may concern:*

Be it known that I, WILLIAM B. FOSTER, a citizen of the United States, residing at Utica, in the county of Oneida and State of New York, have invented certain new and useful Improvements in Bronzing-Machines, of which the following is a specification, reference being had therein to the accompanying drawing.

My invention relates to a bronzing machine, and I declare that the following is a full, clear, concise and exact description thereof, sufficient to enable one skilled in the art to make and use the same.

In the term used to define this invention there is of course included much more, as the invention is capable of a wide variety of uses. But as I have designed it for the purpose named I designate it in that way simply for convenience of classification and I do not wish to limit myself by the designation.

Figure 1:
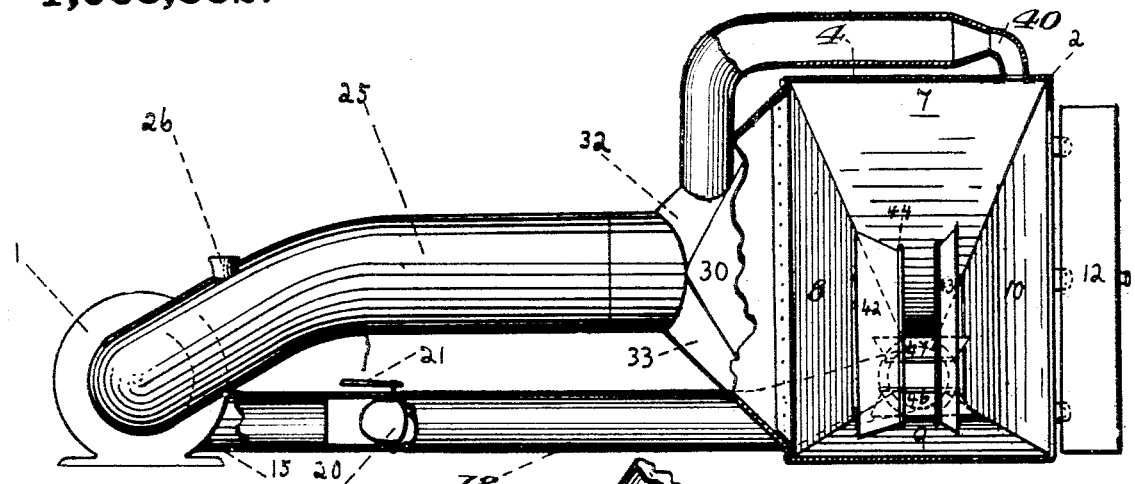
Figure 2:
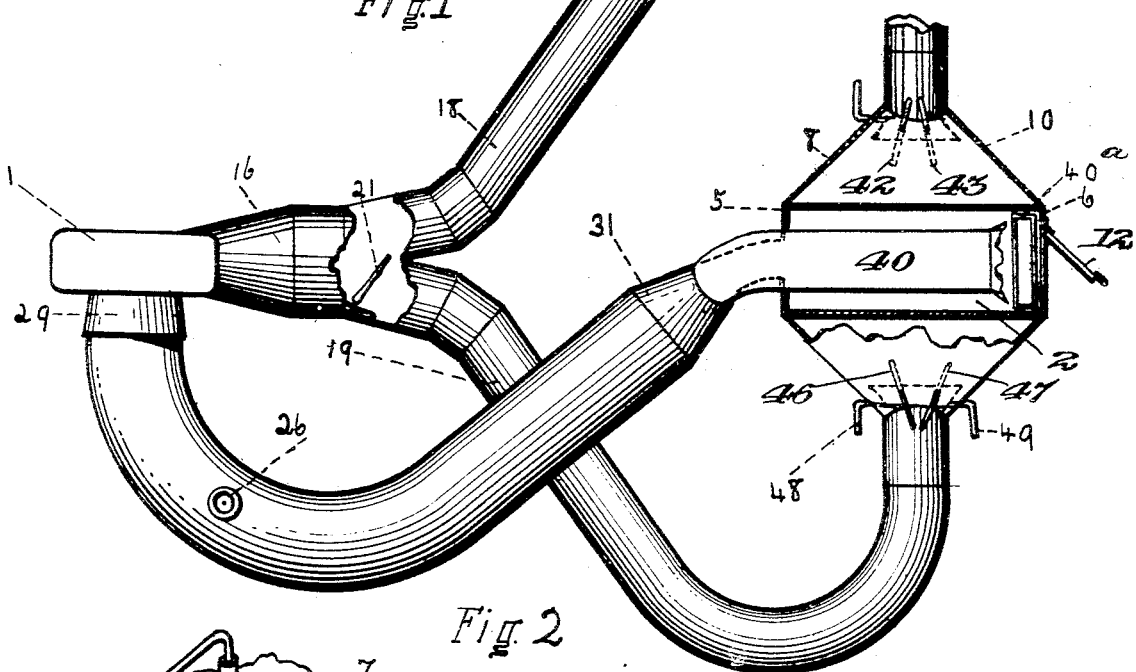
Figure 3:
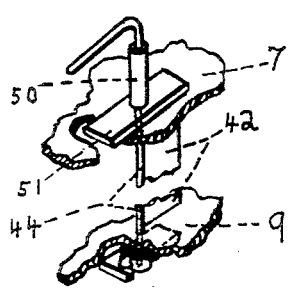

In the drawings Figure 1 is a side view of the apparatus, certain portions being broken away and the bronzing chamber being shown in cross section; Fig. 2 is a plan view with certain portions of the pipe being broken away and the bronzing chamber being shown in horizontal cross section; Fig. 3 is a perspective view of a portion of the wall of the bronzing chamber showing the method of mounting the vanes.

Referring to the figures in detail, 1 represents a blower, which being of ordinary and familiar style of construction, is not shown in detail but simply represented as a whole.

2 represents as a whole the bronzing chamber of the apparatus which is designed to blow powdered bronze onto an article of furniture or the like set inside the bronzing chamber. Of course it will be understood that when I speak of powdered bronze I do so simply for reference. The apparatus can be used for depositing powder or the like on any object.

The bronzing chamber is made of a bottom 3, a top and sides and ends 5 and 6. The sides are made of four plates, 7, 8, 9 and 10, shown in Fig. 1 at one side of the machine which converge to a point where the inlet pipe enters, which will be observed is toward the lower part of the chamber.

It will be understood that on the opposite side are similar walls pierced for an intake opposite the blower. The chamber has a door 12 for tightly closing the chamber after the furniture or other article has been put inside. The intake pipe proceeds from the blower at point 15 and has funnel-shaped portion 16 from which the two feed pipes, 18 and 19, diverge, each taking a course outward so as to enter the chamber at opposite sides and on the axial line so that each blows into the chamber and directly opposite the other.

20 shows a vane with operating handle 21 designed to close either one of the feed pipes 18 and 19 to distribute the powder as desired.

25 represents a suction pipe through which surplus powder is withdrawn from the chamber and passed again through the blower, an opening 26 being provided for the supply of additional material. This suction pipe enters the blower at the side, as indicated at 29, and has a winding course, as clearly seen, so as to approach the chamber from the rear. As it approaches the chamber its walls flare and take the form indicated by walls 31, 32 and 33, and a corresponding wall on the other side opposite to wall 30. This chamber, formed with these walls, opens into the chamber 2 and has an opening of a length substantially equal to the height of the chamber but somewhat narrower than the rear chamber wall, as indicated by dotted lines in Fig. 2. It will be seen that the suction from this pipe, therefore, draws the surplus powder or dust rearward out of this chamber. At the top of the chamber is a branch suction pipe 40 which opens into the chamber at a space substantially equal to the width of the top wall but much narrower so as to form a slot 40ª across the top wall near the front of the chamber so that the dust which is not taken out at the rear will be taken out at the latter opening at the front of the top. The idea is that the dust or powder being blown in on vertical axial line and toward the bottom in oppositely disposed currents is scattered widely throughout the chamber so as to cover the article which has been put in the chamber, and the surplus is withdrawn partly at the rear through an opening extending the vertical height and partly at the front and top through an opening extending the horizontal width and is withdrawn from opposite points. In the chamber are mounted vanes, four on each side; that is to say, in each pyramidal projection at the side of the chamber.

42 and 43 represent vertically disposed vanes mounted on shafts 44 and 45 supported in the walls of the chamber. These vanes can be turned to distribute the powder throughout the chamber as desired. Like vanes are placed on the other side of the chamber, as indicated by dotted lines in Fig. 2. Each vane has its operating handle so disposed as to indicate the direction in which the vane lies. It will be observed that the shaft on which each vane swings lies with the path of the blast thrown into the chamber so as to receive and deflect part of the current to either side as desired.

46 and 47 represent two horizontal vanes likewise mounted and provided with handles, such as 48 and 49 (Fig. 2), by which the discharge of powder can be deflected upward or downward as desired. It is evident that both vertical vanes may be disposed to deflect the major portion of the discharge to either side and likewise the horizontal vanes may be so disposed as to scatter it up or down, or the body of the discharge may be divided and portion projected to either side.

In Fig. 3 is shown a portion of one of the top lateral walls, 7, in perspective and a portion of the opposite lower wall, 9, and a portion of the shaft 44. On the upper plate 7 is a sleeve 50 having a base 51 secured to the wall 7, the sleeve receiving the shaft 44, so that there is no opportunity for the escape of dust through the mounting. The opposite end of the shaft 44 is mounted in socket 52 mounted on the bottom plate 9.

Having described my invention, what I claim as new and desire to secure by Letters Patent, is:

1. The apparatus for applying coating material to articles comprising a closed coating chamber provided with a door and supporting means operating in connection with said chamber, a source of air under pressure and connections communicating with said chamber to create air currents within the same, means to supply coating material to said air currents to be carried thereby into engagement with articles within said chamber and means for removing the surplus coating material from said chamber comprising a suction pipe connected with said chamber and a collector mounted in connection with said suction pipe.

2. The apparatus for applying coating material to articles comprising a closed coating chamber provided with a door and supporting means operating in connection with said chamber, a source of high pressure compressed air and valved connections comprising opposing jet nozzles opening in said chamber to create air currents within the same, means to feed coating material to said connections to be thereby carried into said chamber and suspended in the air currents and forcibly carried into impingement with the articles in said chamber and means to remove surplus coating material from said chamber and the articles therein.

3. The apparatus for applying coating material to articles comprising a closed coating chamber provided with a door and supporting means operating in connection with said chamber, a source of high pressure compressed air and valved connections comprising opposing jet nozzles opening in said chamber to create air currents within the same and means to feed coating material to said connections to be thereby carried into said chamber and suspended in the air currents and forcibly carried into impingement with the articles in said chamber.

4. The apparatus for applying coating material to articles comprising a closed coating chamber provided with a door and supporting means operating in connection with said chamber, a source of high pressure compressed air and valved connections comprising opposed impelling jet nozzles at different parts of said chamber to create air currents therein, means to supply coating material to said air currents to be thereby carried into engagement with articles in said chamber and means to remove surplus coating material from said chamber and the articles therein.

5. The apparatus for applying coating material to articles comprising a closed coating chamber provided with a door and supporting means operating in connection with said chamber, a source of high pressure compressed air and valved connections comprising opposed impelling jet nozzles at different parts of said chamber to create air currents therein and means to supply coating material to said air currents to be thereby carried into engagement with articles in said chambers.

6. The apparatus for applying coating material to articles comprising a closed coating chamber provided with a door and supporting means operating in connection with said chamber, deflectors within said chamber to deflect the air currents therein, a source of air under pressure and connections therewith opening in said chamber to create air currents therein and carry suspended particles of coating material into engagement with articles in said chamber, means to remove from said chamber surplus coating material and means for supplying pulverulent material to said air.

7. A machine of the kind specified comprising a closed chamber adapted to receive articles to be coated, a blower, means establishing communication between the delivery and suction ends of said blower and said chamber respectively for circulating air through the latter, means for introducing coating material into the air delivered into said chamber, and means for reversing the direction of travel of the air through said chamber without interrupting the operation of said blower.

In testimony whereof I hereunto affix my signature in the presence of two witnesses.

WILLIAM B. FOSTER.

Witnesses:
T. L. WILDER,
ELEANOR T. DE GIORGI.